United States Patent [19]
Yuen et al.

[11] Patent Number: 6,056,012
[45] Date of Patent: May 2, 2000

[54] INLINE CHECK VALVE

[75] Inventors: Kaye Kit-Han Yuen, Minneapolis; Ronald Dennis Jungmann, Maplewood; Scott Randall Olson, Mahtomedi, all of Minn.

[73] Assignee: Ecolab Inc., St. Paul, Minn.

[21] Appl. No.: 09/257,569

[22] Filed: Feb. 25, 1999

[51] Int. Cl.[7] .............................. F16K 51/00; F16K 5/00

[52] U.S. Cl. .................................. 137/614.2; 137/533.13

[58] Field of Search ........................... 137/614.2, 533.13, 137/533.15, 614, 533.19

[56] References Cited

U.S. PATENT DOCUMENTS

| | | | |
|---|---|---|---|
| 4,422,472 | 12/1983 | Klein | 137/614.2 X |
| 5,551,479 | 9/1996 | Graves | 137/614.2 |
| 5,593,292 | 1/1997 | Ivey | 137/533.15 X |

*Primary Examiner*—Kevin Lee
*Attorney, Agent, or Firm*—Mau & Krull, P.A.

[57] ABSTRACT

A container (10) has a valve (20) to control flow of liquid out of the container (10). The valve (20) has an inline check valve (30) positioned in the inlet section (22) of the valve (20). The inlet section (22) of the valve (20) is in turn positioned in the discharge port (13) of the container (10), thereby positioning the check valve (30) on the inlet side of the valve (20) and in the container (10) so as to be tamper-resistant.

8 Claims, 3 Drawing Sheets

INLINE CHECK VALVE

BACKGROUND OF THE INVENTION

1. Field of the Invention

This invention relates generally to an inline check valve and more particularly to an inline check valve for bulk containers which hold liquids.

2. Description of the Prior Art

Peracids and other chemicals are often transported in totes or intermediate bulk containers. These containers have a capacity of approximately 330 gallons, although it is understood that other suitable sizes may be utilized. The containers provide for the efficient transportation of chemicals. The chemicals do not have to be individually packaged and hence transportation and packaging costs may be reduced by shipping chemicals in bulk. Further, they are more readily used at their final destination. Once the chemicals are at a desired location, they are pumped from the container for appropriate use.

The containers have an outlet that has internal threads. A ball valve is operatively connected to the outlet of the container and the ball valve prevents the chemical from exiting the container unless the ball valve is moved to the open position.

However, because of the nature of the chemicals being transported in the containers, it is very important to prevent the pump back of incompatible materials into the container. This may cause a very hazardous situation wherein the chemicals and contaminants which may be pumped back could cause an explosion, resulting in potential damage to property and loss of life.

Check valves have been utilized for such purposes. However, such check valves are added to the downstream side of the ball valve (away from the container) and may be tampered with or removed.

The present invention addresses the problems associated with the prior art devices and provides for an inline check valve which is positioned to be tamper-resistant. The present invention also provides for a method and apparatus for making containers having a tamper-resistant check valve.

SUMMARY OF THE INVENTION

In one embodiment, the invention is a valve for controlling the flow of a liquid from a bulk container having a discharge port. The valve includes a valve body having an inlet section and an outlet section. The inlet section has a threaded exterior and a threaded interior. A ball value has a central bore and is positioned between the inlet section and the outlet section. A handle is provided for moving the ball value between an open position and a closed position. A check valve is positioned in the inlet section. The check valve includes a check valve body having a bore formed therein and an inlet and an outlet. The check valve body has a threaded exterior portion and a threaded interior portion. A bushing has a bore formed therein. The bushing has exterior threads for connecting to the threaded interior of the check valve body. A check valve ball is positioned in the check valve body. The ball value is moveable by fluid flow between a blocking position and an unblocking position. The threaded exterior of the exterior portion of the check valve body is threadably engaged with the threaded interior of the inlet section of the valve body. The threaded exterior of the inlet section of the valve body operatively connects the valve to the discharge port, wherein the check valve is tamper-resistant and prevents contaminants from entering the discharge port.

In another embodiment, the invention is a bulk container for a liquid. The bulk container includes a housing defining an inner cavity for holding the liquid to be dispensed. A liquid discharge port is in fluid communication with the inner cavity. The discharge port has an opening. A valve is provided for controlling the flow of liquid from the container. The valve has a valve body having an inlet section and an outlet section. A fluid passage extends through the valve body and a handle is provided for opening and closing the fluid passage. A check valve is positioned in the inlet section of the valve. The inlet section of the valve engages the discharge port, wherein the check valve is thereby positioned in the discharge port also and the check valve is tamper-resistant and prevents contaminants from entering the inner cavity.

In another embodiment, the invention is a method for providing a tamper-resistant back-flow prevention device for a bulk container of liquid having a discharge port with a ball valve attached thereto to control flow of liquid out of the container. The method includes tapping threads to the inside portion of an inlet section of the ball valve. Then, a check valve is threaded into the inlet section of the ball valve and the ball valve is threaded back into the discharge port of the container.

DETAILED DESCRIPTION OF THE PREFERRED EMBODIMENT

Figure 1:
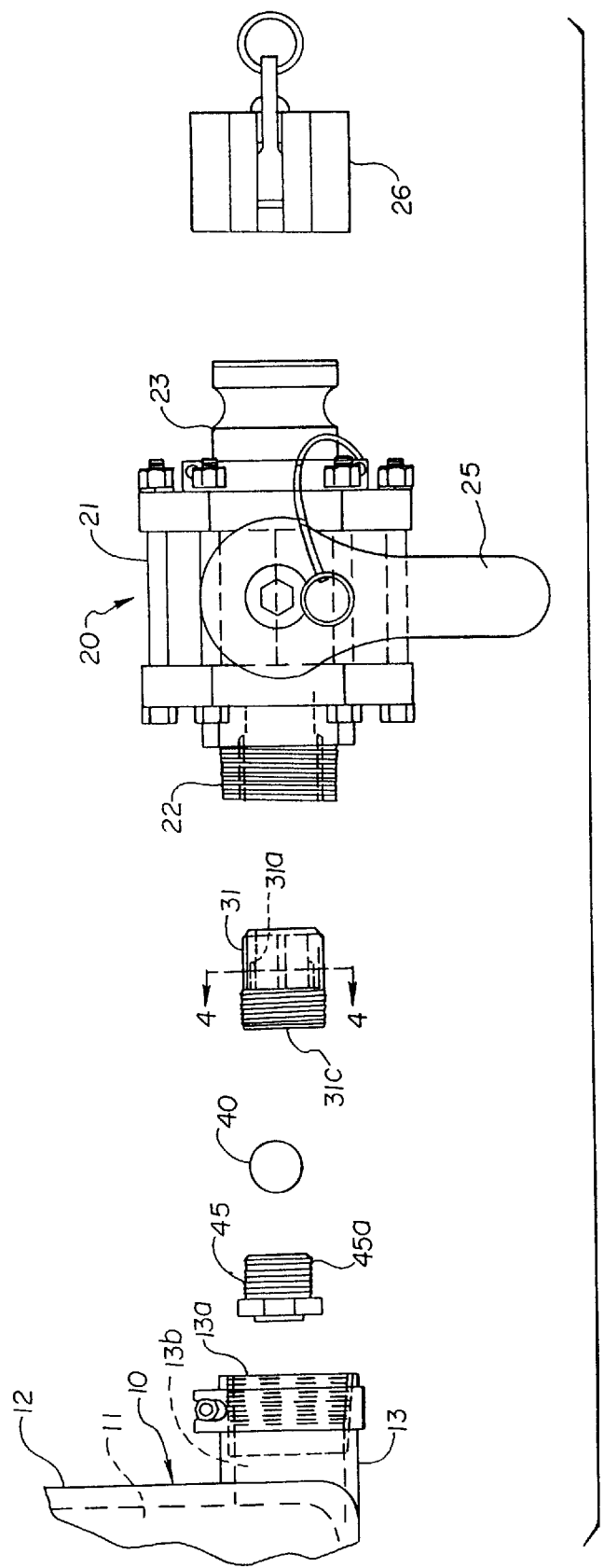
FIG. 1 is an exploded side elevational view of a bulk container having the inline check valve of the present invention.

Referring to the drawings, wherein like numerals represent like parts throughout the several views, there is generally disclosed at 10 a container. The container 10 has an inner cavity 11 defined by outer walls 12. The container 10 is used to transport chemicals such as peracetic acid. However, it is understood that any liquid may be transported. The containers 10 are often referred to as totes or intermediate bulk containers in the industry. The outer walls 12 are continuous and the opening into the inner cavity 11 is provided by the discharge port 13. The discharge port 13 extends out from the container 10 and has an opening 13a which is in fluid communication with the inner cavity 11 by means of a bore 13b. The portion of the bore 13b proximate the opening 13a has internal threads for securing a valve, which will be described in more detail hereafter. While the container 10 may be of any suitable size, a typical size is 330 gallons.

Figure 5:
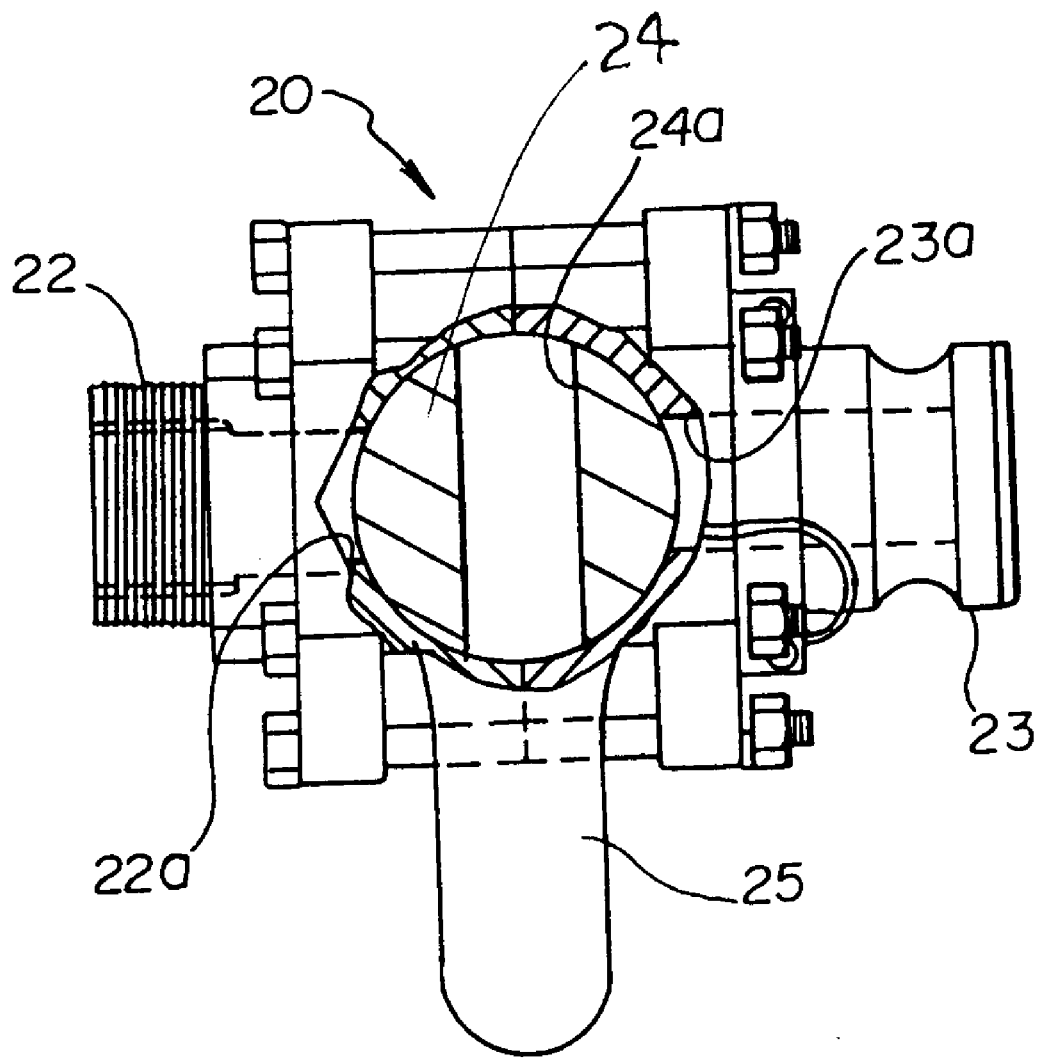
FIG. 5 is a cross-sectional view of the valve shown in FIG. 1.

Referring to FIGS. 1 and 5, there is shown a valve 20. The valve 20 includes a valve body 21. The valve body 21 has an inlet section 22 and an outlet section 23. The inlet section 22 is generally cylindrical and has an outer threaded surface. The inlet section 22 has a fluid passage 22a formed therein. The outlet section 23 is also generally cylindrical and has a fluid passage 23a formed therein. A ball value 24 is positioned in the valve body 21 and has a bore 24a formed therein. As shown in FIG. 5, the ball value 24 is in a closed position. A handle 25 is connected by means well known in the art to the ball 24 and is used to rotate the ball between the open and closed position. When in the closed position, the ball 24 prevents fluid flow from the fluid passages 22a to fluid passageway 23a. When rotated 90 degrees by the handle 25, the central bore 24a connects the fluid passages 22a and 23a allowing fluid to flow through the valve 20. A dust cover 26 is provided to be placed over the outlet section 23 and is in position when not in use. When it is desired to transfer liquid from the container 10 to the valve 20, a pump (not shown) is connected to the outlet section 23. The valve 20 described so far is a very typical valve well known in the art. The outer threaded surface of the inlet section 22 is typically threaded into the discharge port 13 to connect the valve 20 to the container 10. Such a valve may be any suitably sized ball valve, such as a two inch Banjo® valve obtained from Banjo Corp. located at Crawfordsville, Ind.

Figure 2:
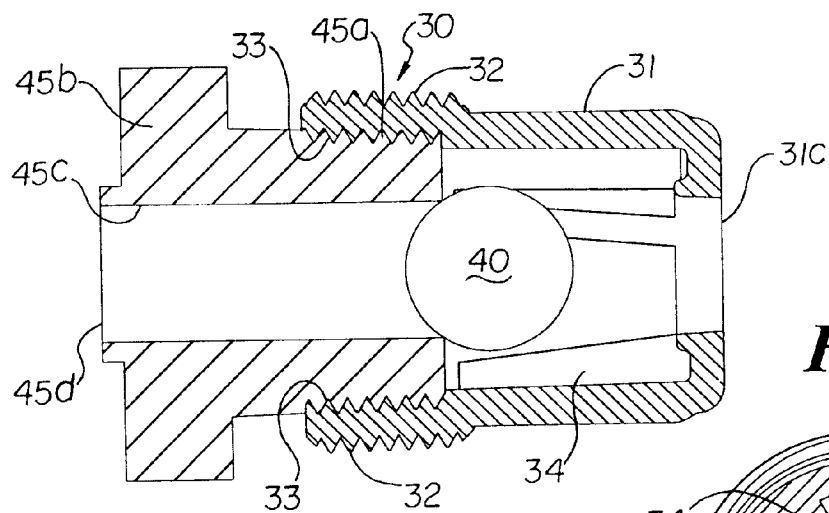
FIG. 2 is a cross-sectional view of the check valve in a closed position.
Figure 4:
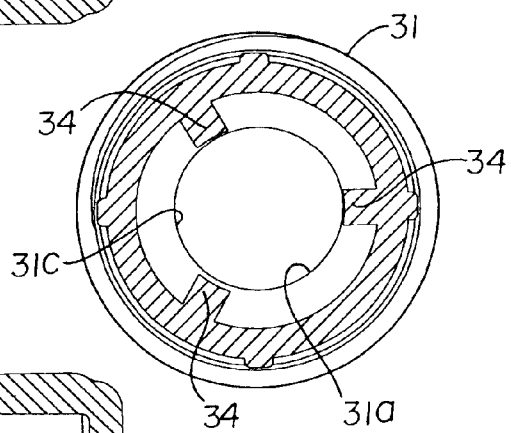
FIG. 4 is a cross-sectional view of the check valve taken along the lines 4—4 as shown in FIG. 1.
Figure 3:
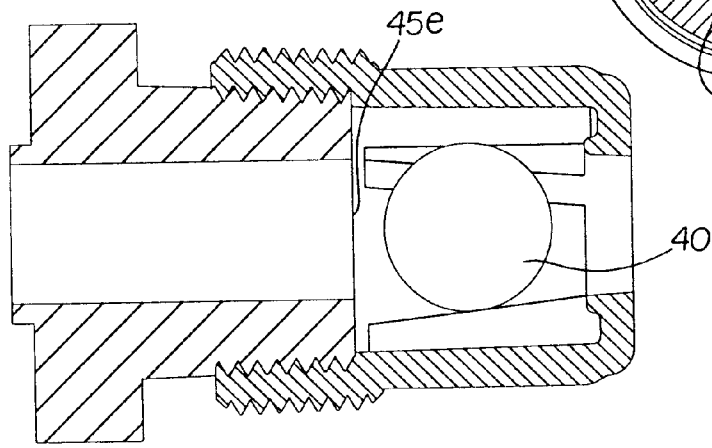
FIG. 3 is a cross-sectional view of the check valve in an open position.

As described in the Background of the Invention, the prior art valves alone do not protect against back pumping of contaminants into the container 10. The prior art devices have added a check valve to the outlet section 23 and this is proved not to be satisfactory. The present invention modifies the existing valves and provides a tapped and inner threaded inlet section 22. The outer threaded surface on a 2-inch valve is a 2-inch male NPT threads while the inner surface is a 1.25 inch by 0.625 inch female NPT threads. The valve 20 is then able to receive the check valve 30. The check valve 30 includes a check valve body 31, a check valve ball 40 and a bushing 45. The check valve body 31 is generally cylindrical in shape and has a bore 31a formed therein. The bore 31a has an inlet 31b and an outlet 31c (0.625 inch diameter). The check valve body 31 has a threaded exterior portion having threads 32 (1.25 inch NPT male threads) and a threaded internal portion having threads 33 (1.0 inch NPT female threads). Three valve ball guides 34 are formed in the bore 31a. The guides 34 extend radially inward and are inclined. The guides extend closer to the longitudinal center of the bore 31a proximate the outlet 31c and are sloped outward as they go towards the inlet 31b. The check valve ball 40 is positioned between the guides 34. The ball 40 may be made of any suitable material such as Viton® material which is a fluoroelastomer or other suitable polymers. At the outlet 31c, the three guides 34 form a diameter which is smaller than that of the ball 34 and prevent the ball 40 from travelling further right, as shown in FIG. 3. This prevents the check valve ball 40 from closing the outlet 31c. At the inlet end, the guides 34 do not restrict the travel of the check valve ball 40 to the left, as shown in FIG. 2. Instead, the bushing 45 acts as a stop for the check valve ball 40. The bushing 45 is generally cylindrical and has external threads 45a which are sized and configured to mate with the internal threads 33 of the check valve body 31. At one end of the bushing 45 is a hex nut shaped protrusion 45b which is utilized to grasp the bushing and thread it into the check valve body 31. The bushing 45 has a bore 45c (0.625 inch diameter) which is formed in the bushing 45 and is in alignment with the bore 31a. The bore 45c has an inlet 45d and an outlet 45e. The outlet 45e is sized smaller than the diameter of the check valve ball 40. Therefore, when the check valve ball 40 is in the position shown in FIG. 2, it blocks any flow of liquid back into the container 10. It is understood that the specific sizes given are for a preferred embodiment and that the sizes may be varied and still not depart from the spirit and scope of this invention.

In use, the check valve 30 is assembled by placing the check valve ball 40 inside of the check valve body 31 and the bushing 45 secured in the check valve body 31 by screwing the bushing into the check valve body 31. The ball 40 is free to float and move in the check valve body 31 between the two positions as shown in FIGS. 2 and 3, depending on the motion of the liquid. The check valve 30 is then secured in the inlet section 22 by screwing the exterior threads of the check valve body 31 into the internal threads of the inlet section 22. The valve 20 is then threadably mated to the discharge port 13 by screwing the outer threads of the inlet section 22 into the internally threaded discharge port opening 13a. This positions the check valve 30 inside of the valve 20 inlet section 22 which is in turn positioned inside of the discharge port 13. A suitable pump (not shown) is then connected to the outlet of valve 20 and liquid is pumped out of the container 10 after the valve has been moved to the open position. Any attempt to pump a contaminant or other liquid back into the container 10 will be prevented by the check valve 30 being in the position shown in FIG. 2. This will prevent the potentially hazardous situation where the container 10 is attempted to be used to store other chemicals which may be incompatible with the original chemical that was placed in the container 10. This incompatibility has been known to give rise to explosions which, of course, are quite dangerous. The position of the check valve 30 provides for a tamper-resistant check valve so that the check valve is not easily tampered with when one wishes to use the container 10 for a storage of incompatible liquids.

While the present invention utilizes threads to connect the various components, it is understood that other suitable connections may be used (e.g., bayonet-type connections), but threads are an inexpensive way to provide a good sealing connection between the components.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A valve for controlling the flow of a liquid from a bulk container having a discharge port, the valve comprising:
   a) a valve body having an inlet section and an outlet section;
   b) the inlet section having a threaded exterior and a threaded interior;
   c) a ball valve having a central bore, the ball valve positioned between the inlet section and the outlet section;
   d) a handle for moving the ball valve between an open position and a closed position;
   e) a check valve positioned in the inlet section, the check valve comprising:
      i) a check valve body having a bore formed therein and an inlet and an outlet;
      ii) the check valve body having a threaded exterior portion and a threaded interior portion;
      iii) a bushing having a bore formed therein, the bushing having exterior threads for connecting to the threaded interior of the check valve body;
      iv) a check valve ball positioned in the check valve body, the check valve ball moveable by fluid flow between a blocking position and an unblocking position; and
      v) the threaded exterior of the exterior portion of the check valve body threadably engaging the threaded interior of the inlet section of the valve body; and f) the threaded exterior of the inlet section of the valve body operatively connects the valve to the discharge port, wherein the check valve is tamper-resistant and prevents contaminants from entering the discharge port.

2. The valve of claim 1, further comprising a plurality of valve ball guides positioned around the bore of the check valve and extending radially inward.

3. The valve of claim 2, wherein the valve ball guides are inclined and slope inward toward the outlet.

4. A bulk container for a liquid, comprising:
   a) a housing defining an inner cavity for holding the liquid;
   b) a liquid discharge port in fluid communication with the inner cavity, the discharge port having an opening having internal threads;
   c) a valve for controlling flow of the liquid, the valve comprising:
      i) a valve body having an inlet section and an outlet section;
      ii) a fluid passage extending through the valve body; and
      iii) a handle for opening and closing the fluid passage;
   d) a check valve positioned in the inlet section of the valve; and
   e) the inlet section of the valve having a threaded exterior for threadably engaging the internal threads of the discharge port, wherein the check valve is thereby positioned in the discharge port also and the check valve is tamper-resistant and prevents contaminants from entering the inner cavity.

5. The bulk container of claim 4, the check valve further comprising:
   a) a check valve body having a bore formed therein and an inlet and an outlet;
   b) the check valve body having a threaded exterior portion and a threaded interior portion;
   c) a bushing having a bore formed therein, the bushing having exterior threads for connecting to the threaded interior of the check valve body;
   d) a check valve ball positioned in the check valve body, the ball moveable by fluid flow between a blocking position and an unblocking position; and
   e) the threaded exterior of the exterior portion of the check valve body threadably engaging the threaded interior of the inlet section of the valve body.

6. The bulk container of claim 5, further comprising a plurality of valve ball guides positioned around the bore of the check valve and extending radially inward.

7. The bulk container of claim 6, wherein the valve ball guides are inclined and slope inward toward the outlet.

8. A method for providing a tamper-resistant back flow prevention device for a bulk container of liquid having a discharge port with a ball valve attached thereto to control flow of liquid out of the container, comprising:
   a) tapping threads to an inside portion of an inlet section of the ball valve;
   b) threading a check valve into the inlet section of the ball valve; and
   c) threading the ball valve into the discharge port, wherein the check valve is positioned in the discharge port and the check valve is tamper-resistant and prevents contaminants from entering the bulk container.

* * * * *